US009875276B2

(12) United States Patent
Golec et al.

(10) Patent No.: US 9,875,276 B2
(45) Date of Patent: Jan. 23, 2018

(54) DATABASE VIEW GENERATION

(71) Applicant: SAP SE, Walldorf (DE)

(72) Inventors: Adrian Golec, Schwetzingen (DE);
Fabian Hammann, Schifferstadt (DE);
Georg Lang, Ludwigshafen am Rhein (DE)

(73) Assignee: SAP SE, Walldorf (DE)

( * ) Notice: Subject to any disclaimer, the term of this patent is extended or adjusted under 35 U.S.C. 154(b) by 315 days.

(21) Appl. No.: 14/739,555

(22) Filed: Jun. 15, 2015

(65) Prior Publication Data

US 2016/0364445 A1    Dec. 15, 2016

(51) Int. Cl.
*G06F 17/30* (2006.01)
*G06Q 10/10* (2012.01)

(52) U.S. Cl.
CPC .. *G06F 17/30418* (2013.01); *G06F 17/30383* (2013.01); *G06F 17/30386* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 6,038,566 A * | 3/2000 | Tsai | | G06F 17/30595 |
| 7,111,231 B1 * | 9/2006 | Huck | | G06F 17/30867 |
| | | | | 715/205 |
| 2003/0164857 A1 * | 9/2003 | Warren | | G06F 17/30994 |
| | | | | 715/764 |
| 2004/0117383 A1 * | 6/2004 | Lee | | G06F 17/30286 |
| 2004/0122844 A1 * | 6/2004 | Malloy | | G06F 17/30592 |
| 2005/0021548 A1 * | 1/2005 | Bohannon | | G06F 17/30914 |
| 2007/0162438 A1 * | 7/2007 | Unz | | G06F 17/30887 |
| 2007/0180471 A1 * | 8/2007 | Unz | | G06F 17/3089 |
| | | | | 725/52 |
| 2007/0233641 A1 * | 10/2007 | Chong | | G06F 17/30407 |
| 2008/0228829 A1 * | 9/2008 | Crutchfield | | G06F 17/30554 |
| 2008/0300952 A1 * | 12/2008 | Couper | | G06Q 10/06 |
| | | | | 705/7.13 |

(Continued)

OTHER PUBLICATIONS

Communication pursuant to Article 94(3) EPC for EP Application 16174504.7, dated Jan. 23, 2017, 10 pages.

(Continued)

*Primary Examiner* — Hung Le
(74) *Attorney, Agent, or Firm* — Brake Hughes Bellermann LLP

(57) ABSTRACT

In some embodiments, a system for database view generation may include a view generator configured to generate a database view for one or more database tables. The view generator includes a generation module configured to determine a generation template for the database view, where the generation template is a code structure describing a manner in which the database view is created. The code structure does not reference a database name of the one or more database tables. The generation module is configured to invoke a code composer to insert code commands into the generation template to build a structured query language (SQL) statement for the database view, where the SQL statement references the database name of the one or more database tables. The view generator is configured to create the database view based on the SQL statement.

20 Claims, 4 Drawing Sheets

(56) References Cited

U.S. PATENT DOCUMENTS

| | | | |
|---|---|---|---|
| 2012/0136869 A1 | 5/2012 | Kaufmann et al. | |
| 2013/0254171 A1* | 9/2013 | Grondin | G06F 17/30477 707/693 |
| 2013/0332387 A1* | 12/2013 | Mirra | G06Q 40/00 705/36 R |
| 2014/0115007 A1* | 4/2014 | Harvey | G06F 17/30289 707/796 |
| 2015/0120785 A1* | 4/2015 | Kemmler | G06F 17/30292 707/803 |
| 2015/0154270 A1* | 6/2015 | Marinoiu | G06F 17/30563 707/602 |

OTHER PUBLICATIONS

"Database", Wikipedia,—the free encyclopedia, retrieved from the Internet: URL:https://en.wikipedia.org/w/index.php?title=Database&oldid=666315391, Jun. 10, 2015, 20 pages.

"Stored procedure", Wikipedia, the free encyclopedia, Retrieved from the Internet: URL:https://en.wikipedia.org/w/index.php?title=Stored procedure&oldid=651918144, Mar. 18, 2015, pp. 1-5.

"View (SQL)", Wikipedia, the free encyclopedia, Retrieved from the Internet: URL:https://en.wikipedia.org/w/index.php? title=View (SQL)&oldid=665327197, Jun. 3, 2015, 3 pages.

European Search Report for EP Application 16174504.7, dated Sep. 9, 2016, 7 pages.

\* cited by examiner

DATABASE VIEW GENERATION

BACKGROUND

Often, customers of a database management system want to perform reporting on the underlying data contained in the database management system. For instance, a customer may want to create a day-end sales report per product, or report on how many parcels were handled by each logistics depot in a certain area. Also, in some examples, a customer may want to create a report to calculate the amount of unbilled transactions.

However, in these types of systems, the level of aggregation may be relatively high (e.g., combining many tables in many different manners), and the available dimensions may be relatively low. Also, in some examples, the database management system may be large (e.g., storing millions of transactions in its database tables). Some conventional approaches suggest importing the transactional data into a business warehouse and then setting up defined queries. However, this approach and other similar approaches require a relatively large amount of resources in terms of memory and hardware resources. Furthermore, the fact that customers can make many different types of customizations to the database tables can make reporting on transactional data relatively difficult.

SUMMARY

In some embodiments, a system for database view generation may include at least one processor, and a non-transitory computer-readable storage medium including instructions executable by the at least one processor. The instructions are configured to implement a view generator configured to generate a database view for one or more database tables. The view generator includes a generation module configured to determine a generation template for the database view, where the generation template is a code structure describing a manner in which the database view is created. The code structure does not reference a database name of the one or more database tables. The generation module is configured to invoke a code composer to insert code commands into the generation template to build a structured query language (SQL) statement for the database view, where the SQL statement references the database name of the one or more database tables. The view generator is configured to create the database view based on the SQL statement.

The system may include one or more of the following features (or any combination thereof). The generation template may include one or more variables in replace of the database name. The generation module may be configured to obtain the generation template from a database storing generation templates. The generation module may be configured to create the generation template. The generation module may be configured to create the generation template by modifying a data definition language (DDL) source to remove references to the database name and to insert a loop statement to process each database table required by the database view. The view generator may be configured to assign the generation module to the generation template. The generation module may be configured to insert generational information into the generation template. The one or more database tables may include a standard database table and a custom database table.

In some embodiments, a non-transitory computer-readable medium storing executable instructions that when executed cause at least one processor to determine that a plurality of database views are to be created, the plurality of database views including a first database view for first database tables and a second database view for second database tables, instantiate a first generation module configured to build the first database view using a first generation template, instantiate a second generation module configured to build the second database view using a second generation template, transform, by the first generation module, the first generation template into a structure query language (SQL) statement capable of providing the first database view, and transform, by the second generation module, the second generation template into an SQL statement capable of providing the second database view.

The non-transitory computer-readable medium may include one or more of the following features (or any combination thereof). The first generation module may be configured to process the first generation template but not the second generation template, and the second generation module is configured to process the second generation template but not the first generation template. The executable instructions may include instructions to invoke a code composer configured to build the first generation template by inserting code commands into the first generation template that reference database names of the first database tables. The executable instructions may include instructions to invoke a code composer configured to build the second generation template by inserting code commands into the second generation template that reference database names of the second database tables. The first generation template may be different than the second generation template, and the first generation template may include a union operation involving the first database tables. The first database tables may be different from the second database tables. The first and second database tables may include custom database tables. The first and second database tables may be part of an in-memory database system.

In some embodiments, a method for view generation includes determining that a plurality of database views are to be created, the plurality of database views including a first database view for first database tables and a second database view for second database tables, instantiating a first generation module configured to build the first database view using a first generation template, instantiating a second generation module configured to build the second database view using a second generation template, transforming, by the first generation module, the first generation template into a structure query language (SQL) statement capable of providing the first database view, and transforming, by the second generation module, the second generation template into an SQL statement capable of providing the second database view.

The method may include one or more of the following features (or any combination thereof). The first generation module may be configured to process only the first generation template, and the second generation module is configured to process only the second generation template. The method may include invoking a code composer configured to build the first generation template by inserting code commands into the first generation template that reference database names of the first database tables. The method may include invoking a code composer configured to build the second generation template by inserting code commands into the second generation template that reference database names of the second database tables.

The details of one or more implementations are set forth in the accompanying drawings and the description below.

Other features will be apparent from the description and drawings, and from the claims.

DETAILED DESCRIPTION

Figure 1:
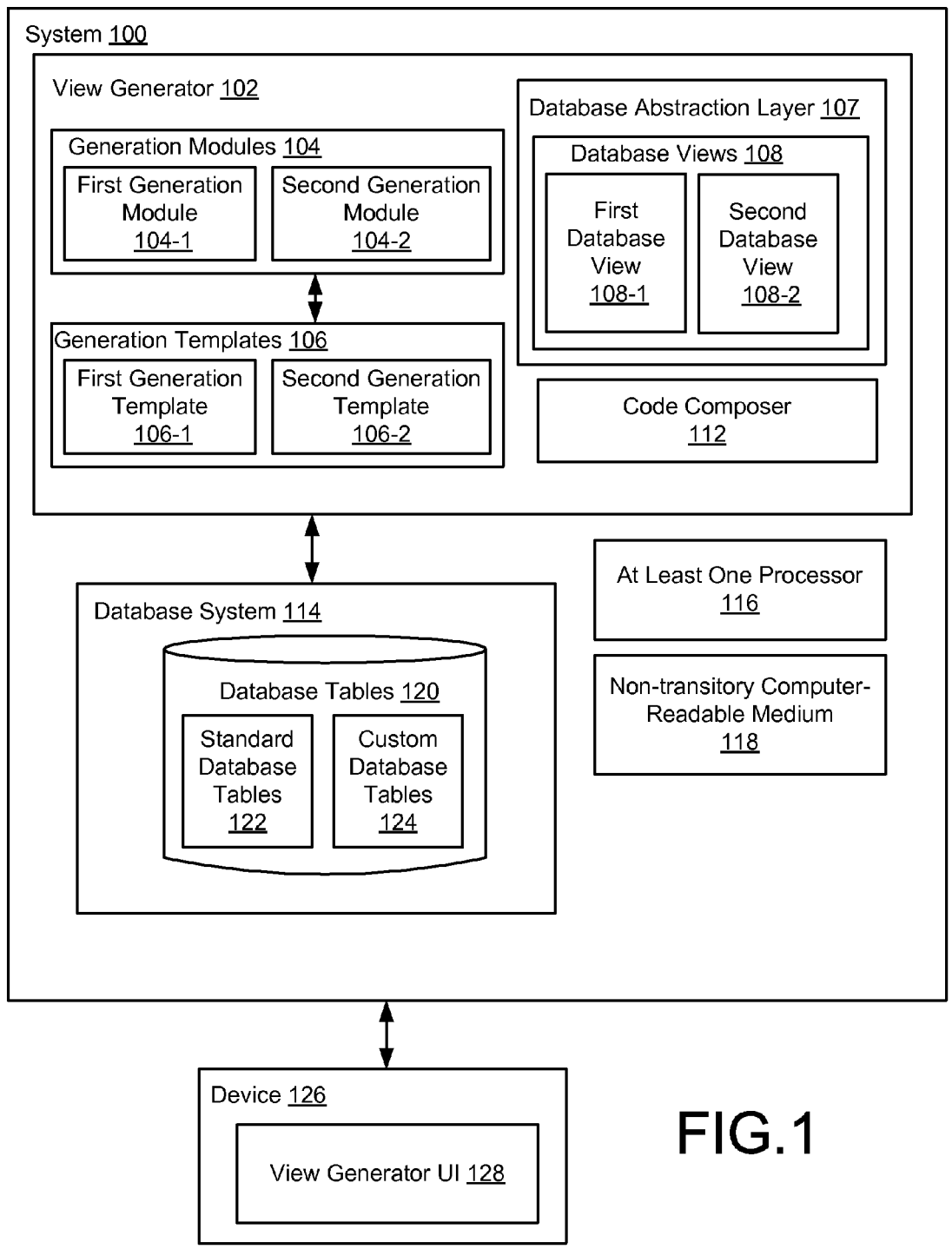
FIG. 1 illustrates a system for view generation according to an implementation.

The systems and methods discussed herein provide a mechanism that generates database views for database tables using generation templates. A database abstraction layer may be built using the database views. The database abstraction layer may provide simplified access to the underlying data of the database tables such that reporting and/or analytics can be performed in a manner that reduces the complexity and the memory resources of the system, and improves the processing speed of the system. A generation template may be a code structure describing a manner in which a single database view is created.

In some systems, customers of the database system have the ability to define custom database tables on top of the standard database tables. In some examples, customers can extend the database tables by inserting new fields and/or new custom database tables. The flexibility of customizing the database tables may create a situation where it is difficult to deliver standard pre-configured reporting or analytics on the underlying data in the database tables, which can be used by customers out of the box without the need to also customize these reports accordingly. For instance, in order to create a database view, the system must know the names of the custom database tables, but often times the names of the customized tables are not known by the reporting/analytics tool when software is packaged and delivered to the customer. Also, the system may be relatively large and complex having multiple dependent tables and database tables with complicated links.

However, according to the embodiments, the system can provide a simplified access layer (e.g., a database abstraction layer having one or more than one database view) to data in the database tables. For example, the system can define the database view as a sales order instead of having to know the underlying database names which can be cryptic names like DBAK, BASRP, BRK, etc. As such, the system can access the underlying data via a different object naming convention that what is used to name the database tables. In some systems, a database view is prevented from having customer information. In other words, in some systems, the database view that is delivered to the customer does not contain any customer-specific information. In these cases, the customer itself must extend the database view on its own to capture customer-specific information. As such, whenever a customer chooses to modify a database table, the customer must also adjust the database view.

According to the embodiments, instead of delivering a proposed database view (or complete or near complete database view), the system provides a generation template that is used to dynamically build the database view in order to capture any customizations applied on the database tables. The generation template may serve as a structure (or outline) on how the database view should be created. The design of the generation template allows the database view to reflect any customer information in the database tables and/or in the customer's own custom tables.

Also, the database view generation as described herein may reduce the technical complexity of the system, and, therefore, may improve the functioning of the system itself. For example, a conventional system may have to generate individual SQL statements for database tables, and then manipulate (e.g., merge, calculate, etc.) the underlying data on the application side. In one example, the conventional system may generate ten separate SQL statements to ten database tables, and then merge the results on the application side. However, according to the embodiments, the system may provide one database view (e.g., one select statement) that is a union across the ten tables implemented by one select statement from the application side, and the SQL statement is parallelized (e.g., parallelization of 10 times) to the ten individual database tables. Furthermore, generating database views using code templates may reduce maintenance efforts and costs. These and other features are further described with reference to the figures.

FIG. 1 illustrates a system 100 for view generation according to an implementation. In some examples, the system 100 may be an enterprise resource planning (ERP) system having a suite of integrated applications that interfaces with a database system 114 to collect, store, manage, and interpret data from activities such as product planning, cost, manufacturing, delivery, marking, and sales.

In some examples, the system 100 may include an invoicing system. In some examples, the invoicing system may be considered a convergent invoicing system, in that it generates a convergent bill where billing data from various sources is aggregated into a single invoice and is processed together. In general, the convergent invoicing system provides the interface to the account receivables systems, handles account receivables charges, discounts and taxes, and supports bill data extraction and formatting for print. The convergent invoicing system may be part of another component, such as a contract accounts and receivable and payable (FI-CA) component that may be part of a larger system such as the ERP system.

The system 100 may include a view generator 102 configured to generate database views 108 for database tables 120 of the database system 114 using generation templates 106. For example, the view generator 102 may be capable of creating one or more database views 108 on one or more underlying database tables 120 using one or more generation templates 106. The view generator 102 may generate one database view 108 or multiple database views 108 during a single database view session. The database view 108 may expose a database table 120 (or portion thereof) or multiple database tables 120 (or portions of multiple database tables 120). In some examples, the view generator 102 may automatically generate a complete database view 108 that accounts for any customization applied to the database tables 120.

In some examples, the system 100 is configured to build a database abstraction layer 107 using the database views 108. The database abstraction layer 107 may be an application programming interface which unifies an application (e.g., invoicing application, inventory application, etc.) and the database tables 120. The database abstraction layer 107 may define various dependencies between the database views 108. The database abstraction layer 107 may provide simplified access to the underlying data of the database tables 120 such that reporting and/or analytics can be performed in a manner that reduces the complexity and the memory resources of the system 100, and improves the processing speed of the system 100. Also, a user may interact with the view generation using a view generator user interface (UI) 128 of a device 126. The device 126 may be any type of client computing device capable of displaying a UI. For instance, the view generator UI 128 may have control(s) to select, control, and start generating database views 108 as described herein.

The system 100 may be implemented with one or more application servers providing the logic for processing interactions between the users and the underlying data, one or more presentation layers (e.g., device 126) providing a graphical user interface for users to interact with various parts of the system 100 (including view generation), and one or more database servers implementing the database system 114. In some examples, the system 100 may include at least one processor 116, and a non-transitory computer-readable medium 118 storing executable instructions, that when executed by the at least one processor 116 are configured to implement the components of the system 100. The non-transitory computer-readable storage medium 118 may include one or more non-volatile memories, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The at least one processor 116 may include any type of special purpose logic circuitry, e.g., an FPGA (field programmable gate array) or an ASIC (application-specific integrated circuit). The at least one processor 116 may include one or more processors coupled to a semi-conductor substrate. Also, the system 100 may include various application programming interfaces (APIs) in a manner that permits the device 126, the database system 114, and the view generator 102 to communicate.

The database system 114 may be any type of database system capable of storing a relatively large amount of data in database tables 120. The database system 114 may be a relational database system. In some examples, the database system 114 is an in-memory database system (IMDB). An IMDB is one type of analytic database, which is a read-only system that stores historical data on metrics for business intelligence/business analytics (BI/BA) applications, typically as part of a data warehouse or data mart. These systems allow users to run queries and reports on the information contained, which is regularly updated to incorporate recent transaction data from an organization's operational systems. In addition to providing fast query response times, in-memory analytics can reduce or eliminate the need for data indexing and storing pre-aggregated data in online analytical processing (OLAP) cubes or aggregate tables. This capacity reduces costs and allows faster implementation of BI/BA applications. In contrast to other database systems, the IMDB includes one or more database engines.

The database system 114 may permit a user to customize one or more of the database tables 120. Therefore, the database system 114 may include standard database tables 122 and custom database tables 124. The custom database tables 124 may be database tables that have been customized by one or more end users of the database system 114. For example, a custom database table 124 may be a table that has been extended by inserting or deleting a new field or inserting a completely new database table. The standard database tables 122 may be database tables that have not been customized by the end user (customer) of the database system 114.

The database tables 120 may store transactional data. In some examples, the transactional data may be financial orders, invoices, payments, plans, activity records, deliveries, storage records, and/or travel records. The transactional data can be financial, logistical or work-related, involving anything from a purchase order to shipping status to employee hours worked to insurance costs and claims. In some examples, the database tables 120 may be considered transactional processing database tables. In some examples, the database tables 120 may be capable of storing a high amount of database transactions. In some examples, the database tables 120 may be capable of storing over a million transactions. In some examples, each transaction may be defined as one or more database items. In some examples, the database tables 120 may be capable of storing over a hundred million database items per day.

The database view 108 may include logic that defines a view of the underlying data contained in one or more database tables 120. In some examples, the database view 108 may be considered a customized database view in the sense that it captures information from one or more custom database tables 124. In some examples, the database view 108 is a Core Data Service (CDS) view defined using data definition language (DDL). In some examples, the database view 108 includes logic that arranges items from the database tables 120 in a specific order, by highlighting certain items, or by showing only certain items, or may include calculation logic (e.g., combining items in a certain way). In some examples, the database view 108 is one or more SELECT queries that has been given a name and saved. In some examples, the database view 108 may be considered a named query or a stored query. In some examples, the database view 108 is defined using structured query language (SQL) syntax having one more SQL statements (e.g. SELECT statements, etc.). Once stored, the database view 108 can be used again and again, rather than re-writing the same query many times. In some examples, the database view 111 may provide logic that joins two or more database tables 120 (e.g., unions or aggregations). In some examples, the database view 108 may include complex logic or calculations on the underlying data of two or more database tables 120. In some examples, the database view 108 can be used a security mechanism in the sense that permissions can be set on the database view 108 (e.g., certain columns/rows) instead of the underlying database tables 120.

The generation templates 106 may be processed by dedicated generation modules 104, which are assigned to each generation template 106. For example, the view generator 102 may include a plurality of generation modules 104, where each different generation module 104 is assigned to process a particular generation template 106. In some examples, the number of generation modules 104 may be the same as the number of generation templates 106 to be created. For instance, when it is determined to create a particular database view 108, the view generator 102 may instantiate a generation module 104 corresponding to that particular database view 108, and this process repeats for every database view 108 to be created. In some examples, the generation modules 104 are dedicated code modules stored in a configuration database (e.g., view configuration 204) of the view generator 102.

The view generator 102 may be configured to determine which and how many database views 108 to be created. For instance, a user may define or select the type of database views 108 using the view generator UI 128. If the view generator 102 determines that there are two (or more than two), the view generator 102 may be configured to instantiate one generation module 104 to develop a database view 108, and then instantiate another generation module 104 to develop another database view 108, and so forth, until all the database views 108 are created. In some examples, the view generator 102 may sequentially develop the database views 108 from the generational templates 106. In other examples, the view generator 102 may instantiate multiple generation modules 104 in parallel to process multiple generation templates 106 around the same time.

The view generator 102 may instantiate a first generation module 104-1 to process a first generation template 106-1 to build a first database view 108-1, and then instantiate a second generation module 104-2 to process a second generation template 106-2 to build a second database view 108-2. The first database view 108-1 may be different than the second database view 108-2. The first generation module 104-1 may be different than the second generation module 104-2. The first generation module 104-1 may be configured to process only one type of generation template (e.g., only the first generation template 106-1). The second generation module 104-2 is configured to process only one type of generation template (e.g., only the second generation template 106-2). Although the features of the view generator 102 are explained with reference to two generation modules 104, it is understood that the view generator 102 can encompass any number of generation modules 104. For example, if the view generator 102 determines that there are five different database views 108 to be created, the view generator 102 may separately instantiate five different generation modules 104.

The generation template 106 may specify how the corresponding database view 108 is built. The first generation template 106-1 may specify how the first database view 108-1 is created, and the second generation template 106-2 may specify how the second database view 108-2 is created. In some examples, the generation template 106 includes a DDL data source having one or more SQL statements. In some examples, the generation template 106 includes one or more variables that replace the table names of the database tables 120. In some examples, the generation template 106 includes an SQL loop statement that provides logic for multiple database tables 120 required by the corresponding database view 108 such that more detailed code can be built for each database table 120 in a loop fashion. In some examples, the first generation template 106-1 may specify a type of union operation on multiple database tables 120, where the table names and name of the database view are replaced with one or more variables that operate as placeholders. Furthermore, the first generation template 106-1 may specify one or more loop statements in order to process each database table 120 required by the first database view 108-1. In some examples, the second generation template 106-2 may specify a different type of union operation (or an entirely different operation) on one or more database tables 120 that are different (or alternatively the same) than required by the first database view 108-1. Also, the second generation template 106-2 may specify one or more loop statements in order to process each database table 120 required by the second database view 108-2.

In some examples, the generation template 106 may include logic that provides the framework for the view without identifying particular table names of the database tables 120. In some examples, the generation template 106 includes one or more variables that represent the table name and/or view-name. In other words, the generation template 106 may include one or more variables that operate as placeholders for the table names and/or view names. In some examples, the generation template 106 may include one or more wildcard symbols that are replaced when the template is read such that the final SQL statement is build up in the view generator 102.

In some examples, when the first generation module 104-1 has been instantiated, the first generation module 104-1 may obtain the first generation template 106-1 from the database storing the generation templates 106. In other examples, the first generation module 104-1 may create the first generation template 106-1 from a DDL data source having one or more SQL statements. In some examples, when the second generation module 104-2 has been instantiated, the second generation module 104-2 may obtain the second generation template 106-2 from the database storing the generation templates 106. In other examples, the second generation module 104-2 may create the second generation template 106-2 from a DDL data source having one or more SQL statements.

After the first generation module 104-1 has obtained or otherwise derived the first generation template 106-1, the first generation module 104-1 may invoke a code composer 112 to build up the first generation template 106-1 by inserting hard code into the first generation template 106-1. For instance, the code composer 112 may be configured to insert one or more lines of code that reference the underlying database tables 120 (e.g., inserts the database table names) including any customer database tables 124. In some examples, the code composer 112 may generate multiple parallel SQL SELECT statements for the various database tables 120 required by the first database view 108-1. In some examples, the code composer 112 may insert code into the first generation template 106-1 in a manner that replaces the variables (or wildcard symbols) in the first generation template 106-1 with actual names or values required by the SELECT statements. In some examples, the code composer 112 may be configured to develop a complete SQL statement for the first database view 108-1. Then, the view generator 102 may generate the first database view 108-1 using the complete SQL statement.

After the second generation module 104-2 has obtained or otherwise derived the second generation template 106-2, the second generation module 104-2 may invoke the code composer 112 to build up the second generation template 106-2 by inserting hard code into the second generation template 106-2. For instance, the code composer 112 may be configured to insert one or more lines of code that reference the underlying database tables 120 (e.g., inserts the database table names) including any customer database tables 124 required by the second database view 108-2. In some examples, the code composer 112 may generate multiple parallel SQL SELECT statements for the various database tables 120 required by the second database view 108-2. In some examples, the code composer 112 may insert code into the second generation template 106-2 in a manner that replaces the variables (or wildcard symbols) in the second generation template 106-2 with actual names or values required by the SELECT statements. In some examples, the code composer 112 may be configured to develop a complete SQL statement for the second database view 108-2. Then, the view generator 102 may generate the second database view 108-2 using the complete SQL statement.

A non-limiting example of a DDL source used to create a database view 108 is illustrated below:

DDL source

@AbapCatalog.sqlViewName: 'ZZSFLIGHT'
DEFINE VIEW zzsflight_ddl
    AS SELECT * FROM sflight As shown above, the SQL statement includes the name of the view (e.g., ZZSFIGHT), and the name of the database table (e.g., sflight). However, as indicated above, this database table may have been subjected to customizing in which further fields were added or deleted, for example.

In some examples, each generation module 104 is configured to create a corresponding generation template 106-1. Since the database tables 120 and the name of the database view 108 may be customized by the user of the system 100, the first generation module 104-1 may be configured to modify the SQL statement of the DDL source by replacing both the table name and the view name by one or more variables, as shown below:

First Generation Template 106-1

@AbapCatalog.sqlViewName: $viewname$
DEFINE VIEW $viewname_ddl$
    AS SELECT * FROM $tabname$

The modifications to the standard SQL statement are shown in bold. The above first generation template 106-1 includes an SQL statement that defines the database view 108-1 for a single database datable 122. The above first generation template 106-1 uses a variable or symbol (e.g., $) as a placeholder for the tables name and the view name. In other words, the hard coding of the name of the database table 120 and the name of the first database view 108-1 has been removed and replaced with a wildcard variable or symbol.

The first generation module 104-1 may add generation information to the first generation template 106-1. For example, the generation information may identify the developer creating the first database view 108-1, the time in which the first database view 108-1 is generated, or any background information regarding the view generation. An non-limiting example of the inserted generation information is shown below:

First Generation Template 106-1

//generated by $username$ on $creationdate$ at $creationtime$
@AbapCatalog.sqlViewName: $viewname$
DEFINE VIEW $viewname_ddl$
    AS SELECT * FROM $tabname$ In some examples, the first generation module 104-1 may merge multiple database tables 120 into a single result set. For example, the first generation module 104-1 may perform a union on multiple different database tables 120. In some examples, the first generation module 104-1 may merge the database tables 120 using the SQL command UNION ALL. At this point, since the system 100 may not know the total number of database tables 120, the first generation module 104-1 may use the command @repeat, in order to define a loop to be processed by the code composer 112 (e.g., the ABAP code composer). In some examples, the first generation module 104-1 may define the loop if there is more than one database table 120 for the first database view 108-1. The below example is an example of the first generation template 106-1 across multiple database tables 120.

First Generation Template 106-1

//generated by $username$ on $creationdate$ at $creationtime$
@AbapCatalog.sqlViewName: $viewname$
DEFINE VIEW $viewname_ddl$
    AS SELECT * FROM $tabname$
    @if $union$ @initial @optional
    @else
        @repeat repeat
        UNION ALL SELECT * FROM $tabname1$
        @end
    @end The above first generation template 106-1 defines the union of the database tables 120 using a loop in which each step in the loop adds a UNION ALL Select statement to combine a particular database table 120 with the others. The first generation module 104-1 may be configured to instantiate and configure the code composer 112 to replace the variables with actual values (e.g., actual database names) by executing the first generation template 106-1 (e.g., the loop statement of the generation template 106). In some examples, the code composer 112 is configured to introduce commands in place of the variables. For instance, after the code composer 112 has been called by the generation module 104, the code composer 112 may replace the §sign by @. Thus, the first generation module 104-1 in conjunction with the code composer 112 may transform the first generation template 106-1 into a complete SQL-defined database view statement. The view generator 102, the second generation module 104-2, and the code composer 112 may operate in the same manner when creating the second database view 108-2 using the second generation template 106-2.

Figure 2:
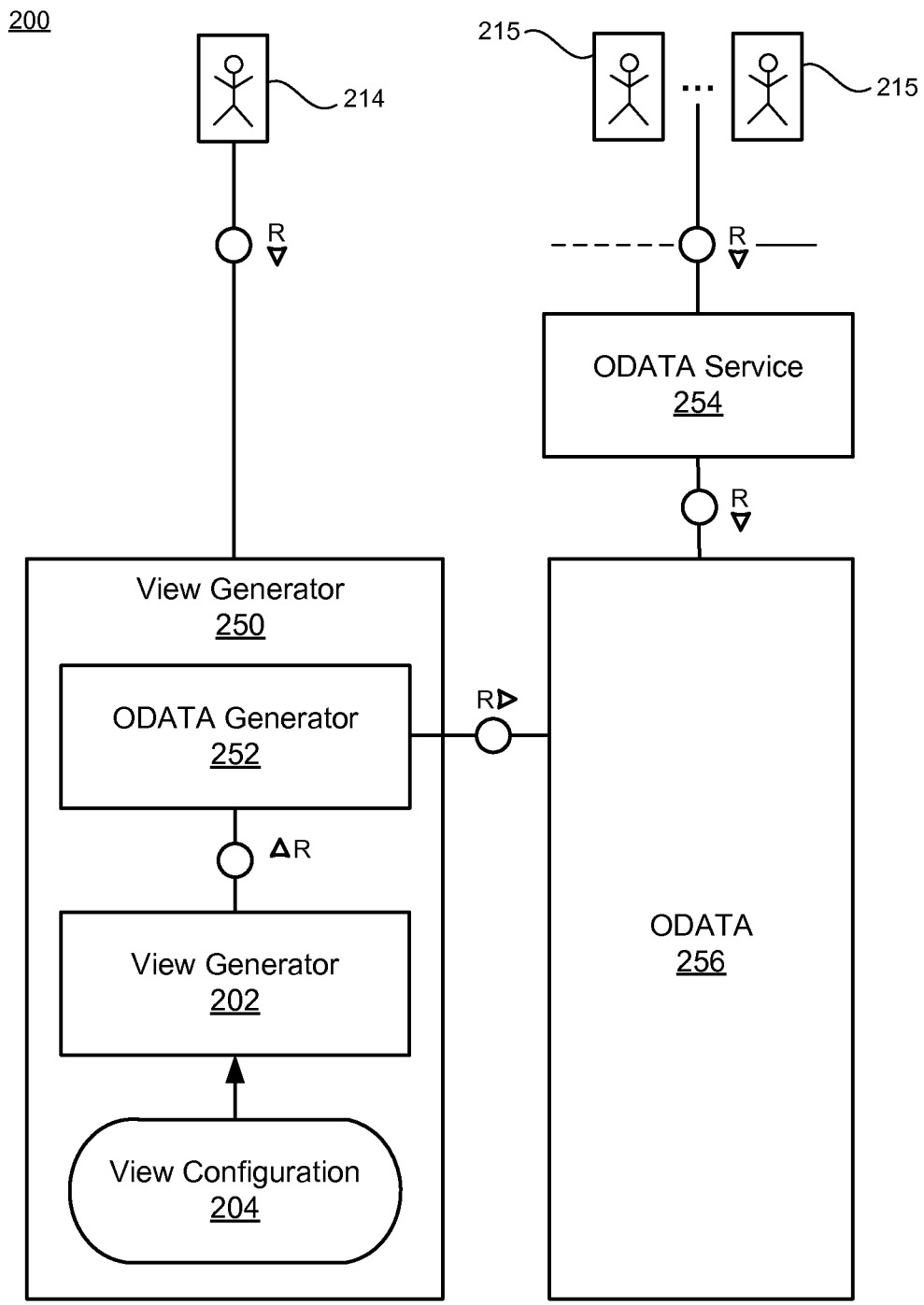
FIG. 2 illustrates a system for view generation according to another implementation.

FIG. 2 illustrates a system 200 for view generation according to another implementation. The system 200 may include a view generator 250, Open Data Protocol (ODATA) 256, and ODATA service 254. In some examples, a developer or system operator 214 may directly interact with the view generator 250, and customers 215 of the underlying system may interact with the view generator 250 using the ODATA 256 and ODATA service 254 which allows the creation and consumption of APIs in order to exchange information over a network between the customers 215 and the view generator 250.

The view generator 250 may be a view generator for a particular type of service provided by an ERP system such as an invoicing service. The view generator 250 may include an ODATA generator 252, a view generator 202, and view configuration 204. In some examples, the ODATA generator 252 may include a Service Adaption Definition Language (SADL). The SADL may be a framework which enables consumption of different business object models, and other entity-based models, in particular DDIC tables and views, in a uniform way. Knowledge of the details of the modeling frameworks such as Business Object Process Framework (BOPF) or Business Object Layer (BOL) is not required. The SAPL may expose all the required information to the user interface. In some examples, the view generator 202 and the view configuration 204 may be implemented by the view generator 102 of FIG. 1.

Figure 3:
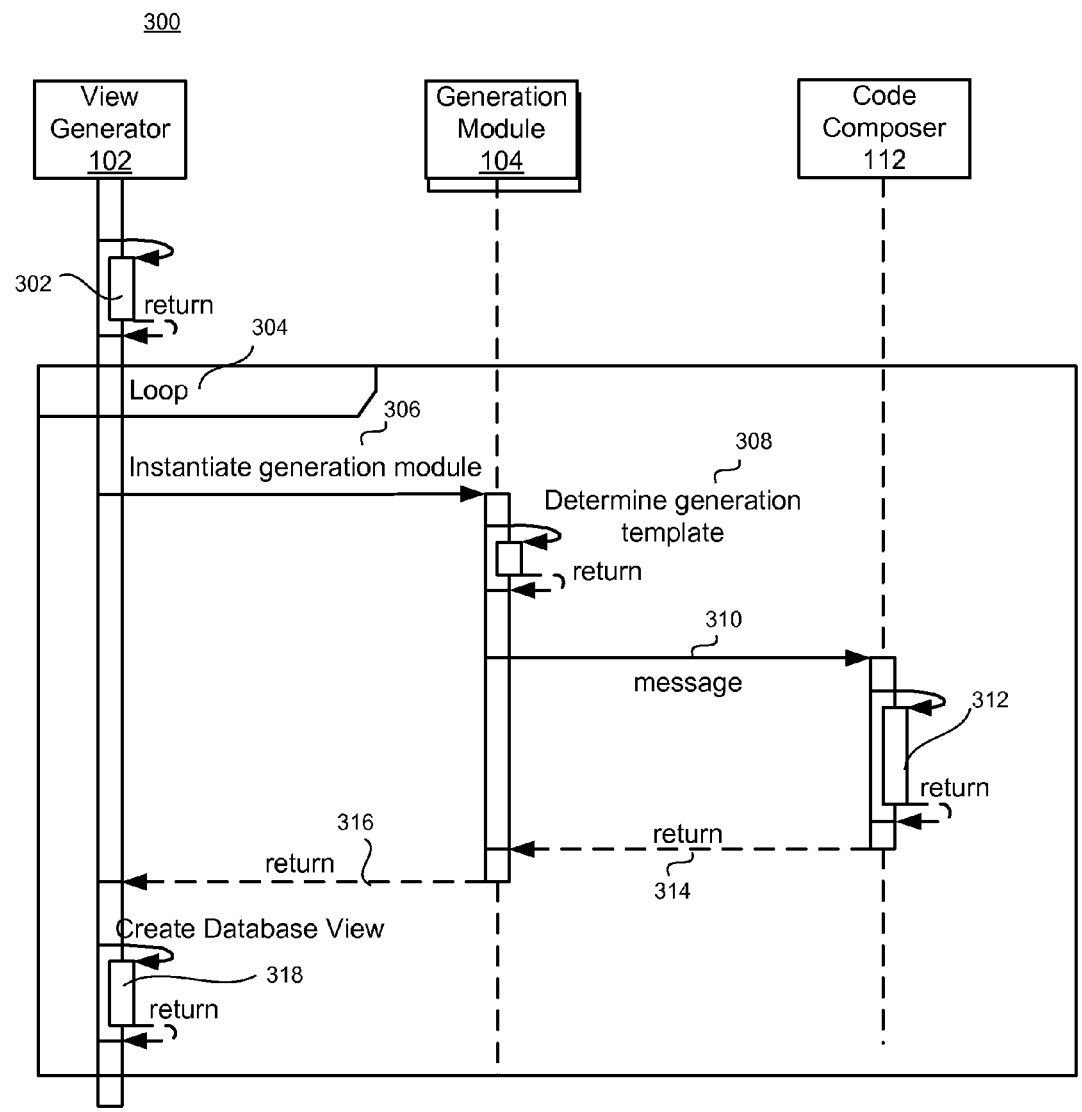
FIG. 3 illustrates a sequence diagram depicting view generation operations performed by the system of FIG. 1 and/or the system of FIG. 2 according to an implementation.

FIG. 3 illustrates a sequence diagram 300 depicting view generation operations performed by the system 100 of FIG. 1 and/or the system 200 of FIG. 2 according to an implementation. In 302, the view generator 314 may determine the database views 108 to be created. The view generator 102 may determine that one database view 108 is to be created. In other examples, the view generator 102 may determine that multiple database views 108 are to be generated. In some examples, in 304, the view generator 102 may create the database views 108 in a loop by sequentially creating each database view 108. For example, in 306, the view generator 102 may create the first database view 108-1 by instantiating the first generation module 104-1 which creates the final SQL statement (e.g., DDL-source based statement) for the first database view 108-1. Then, after the first database view 108-1 is completed, the view generator 102 may instantiate the second generation module 104-2 to create the second database view 108-2. Then, the view generator 102 may repeat this process (e.g., third, fourth generation module, etc.) until all the determined database views 108 have been created.

In 308, the first generation module 104-1 may determine the first generation template 106-1 for the first database view 108 to be created. In some examples, the first generation module 104-1 may obtain the first generation template 106-1 from a database storing the generation templates 106. In other examples, the first generation module 104-1 may create the first generation template 106-1 in the manner described above. Then, in 310, the first generation module 104-1 may message or instantiate the code composer 112. In 312, the code composer 112 is configured to introduce code into the first generation template 106-1 in order to transform the first generation template 106-1 into an SQL statement referencing the custom database tables 124. In 314, the code composer 112 may return the SQL statement to the generation module 104. In 316, the generation module 104 may return the SQL statement to the view generator 102. In 318, the view generator 102 may create the database view 108 based on the SQL statement.

Figure 4:
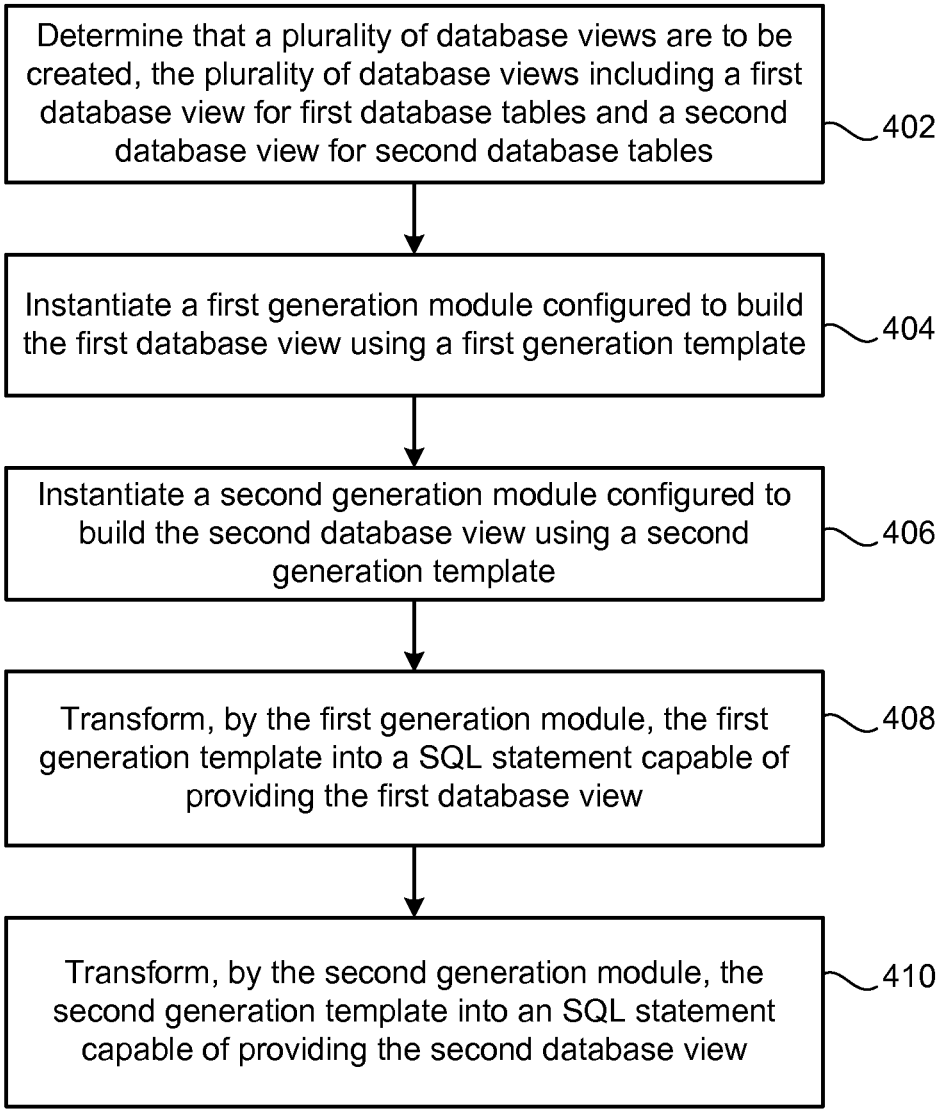
FIG. 4 illustrates a flowchart depicting example operations of the system of FIG. 1 and/or the system of FIG. 2 according to an implementation.

FIG. 4 illustrates a flowchart 400 depicting example operations of the system 100 of FIG. 1 and/or the system 200 of FIG. 2. Although FIG. 4 is illustrated as a sequential, ordered listing of operations, it will be appreciated that some or all of the operations may occur in a different order, or in parallel, or iteratively, or may overlap in time.

A plurality of database views to be created may be determined, where the plurality of database views includes a first database view for first database tables and a second database view for second database tables (402). For example, the view generator 102 may be configured to determine a plurality of database views 108, where the plurality of database views 108 include the first database view 108-1 and the second database view 108-2. The view generator 102 may be configured to determine which and how many database views 108 to be created. For instance, a user may define or select the type of database views 108 using the view generator UI 128.

A first generation module may be instantiated, where the first generation module is configured to build the first database view using a first generation template (404). For example, the view generator 102 may be configured to instantiate the first generation module 104-1 to build the first database view 108-1 using the first generation template 106-1.

A second generation module may be instantiated, where the second generation module is configured to build the second database view using a second generation template (406). For example, the view generator 102 may be configured to instantiate the second generation module 104-2 to build the second database view 108-2 using the first generation template 106-2.

The first generation template may be transformed into a structure query language (SQL) statement capable of providing the first database view (408). For instance, the first generation module 104-1 in conjunction with the code composer 112 is configured to transform the first generation template 106-1 into a SQL statement capable of providing the first database view 108-1.

After the first generation module 104-1 has obtained or otherwise derived the first generation template 106-1, the first generation module 104-1 may invoke the code composer 112 to build up the first generation template 106-1 by inserting hard code into the first generation template 106-1. For instance, the code composer 112 may be configured to insert one or more lines of code that reference the underlying database tables 120 (e.g., inserts the database table names) including any customer database tables 124. In some examples, the code composer 112 may generate multiple parallel SQL SELECT statements for the various database tables 120 required by the first database view 108-1. In some examples, the code composer 112 may insert code into the first generation template 106-1 in a manner that replaces the variables (or wildcard symbols) in the first generation template 106-1 with actual names or values required by the SELECT statements. In some examples, the code composer 112 may be configured to develop a complete SQL statement for the first database view 108-1. Then, the view generator 102 may generate the first database view 108-1 using the complete SQL statement.

The second generation template may be transformed into an SQL statement capable of providing the second database view (410). For instance, the second generation module 104-2 in conjunction with the code composer 112 is configured to transform the second generation template 106-2 into a SQL statement capable of providing the second database view 108-2.

After the second generation module 104-2 has obtained or otherwise derived the second generation template 106-2, the second generation module 104-2 may invoke the code composer 112 to build up the second generation template 106-2 by inserting hard code into the second generation template 106-2. For instance, the code composer 112 may be configured to insert one or more lines of code that reference the underlying database tables 120 (e.g., inserts the database table names) including any customer database tables 124 required by the second database view 108-2. In some examples, the code composer 112 may generate multiple parallel SQL SELECT statements for the various database tables 120 required by the second database view 108-2. In some examples, the code composer 112 may insert code into the second generation template 106-2 in a manner that replaces the variables (or wildcard symbols) in the second generation template 106-2 with actual names or values required by the SELECT statements. In some examples, the code composer 112 may be configured to develop a complete SQL statement for the second database view 108-2. Then, the view generator 102 may generate the second database view 108-2 using the complete SQL statement.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program having the non-transitory computer readable medium, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. The programmable processors may be coupled to one or more semiconductor substrates. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for database view generation, the system comprising:
   at least one processor;
   a non-transitory computer-readable storage medium including instructions executable by the at least one processor, the instructions configured to implement,
   a view generator configured to generate a database view for one or more database tables, the view generator including a generation module configured to determine a generation template for the database view, the generation template being a code structure describing a manner in which the database view is created, the code structure not referencing a database name of the one or more database tables,
   the generation module configured to invoke a code composer to insert code commands into the generation template to build a structured query language (SQL) statement for the database view, the SQL statement referencing the database name of the one or more database tables,
   wherein the view generator is configured to create the database view based on the SQL statement; and
   a database abstraction layer defining dependencies between the database view and one or more other database views, the database abstraction layer being an application programming interface between an application and the one or more database tables.

2. The system of claim 1, wherein the generation template includes one or more variables in replace of the database name.

3. The system of claim 1, wherein the generation module is configured to obtain the generation template from a database storing generation templates.

4. The system of claim 1, wherein the generation module is configured to create the generation template.

5. The system of claim 4, wherein the generation module is configured to create the generation template by modifying a data definition language (DDL) source to remove references to the database name and to insert a loop statement to process each database table required by the database view.

6. The system of claim 1, wherein the view generator is configured to assign the generation module to the generation template.

7. The system of claim 1, wherein the generation module is configured to insert generational information into the generation template.

8. The system of claim 1, wherein the one or more database tables includes a standard database table and a custom database table.

9. A non-transitory computer-readable medium storing executable instructions that when executed cause at least one processor to:
   determine that a plurality of database views are to be created, the plurality of database views including a first database view for first database tables and a second database view for second database tables;
   instantiate a first generation module configured to build the first database view using a first generation template;
   instantiate a second generation module configured to build the second database view using a second generation template;

transform, by the first generation module, the first generation template into a structure query language (SQL) statement capable of providing the first database view;

transform, by the second generation module, the second generation template into an SQL statement capable of providing the second database view; and link the first database view with the second database view in a database abstraction layer, the database abstraction layer being an application programming interface between an application and the first and second database tables.

10. The non-transitory computer-readable medium of claim 9, wherein the first generation module is configured to process the first generation template but not the second generation template, and the second generation module is configured to process the second generation template but not the first generation template.

11. The non-transitory computer-readable medium of claim 9, wherein the executable instructions include instructions to:

invoke a code composer configured to build the first generation template by inserting code commands into the first generation template that reference database names of the first database tables.

12. The non-transitory computer-readable medium of claim 9, wherein the executable instructions include instructions to:

invoke a code composer configured to build the second generation template by inserting code commands into the second generation template that reference database names of the second database tables.

13. The non-transitory computer-readable medium of claim 9, wherein the first generation template is different than the second generation template, and the first generation template includes a union operation involving the first database tables.

14. The non-transitory computer-readable medium of claim 9, wherein the first database tables are different from the second database tables.

15. The non-transitory computer-readable medium of claim 9, wherein the first and second database tables include custom database tables.

16. The non-transitory computer-readable medium of claim 9, wherein the first and second database tables are part of an in-memory database system.

17. A method for view generation, the method comprising:

determining that a plurality of database views are to be created, the plurality of database views including a first database view for first database tables and a second database view for second database tables;

instantiating a first generation module configured to build the first database view using a first generation template;

instantiating a second generation module configured to build the second database view using a second generation template;

transforming, by the first generation module, the first generation template into a structure query language (SQL) statement capable of providing the first database view;

transforming, by the second generation module, the second generation template into an SQL statement capable of providing the second database view; and linking the first database view with the second database view in a database abstraction layer, the database abstraction layer being an application programming interface between an application and the first and second database tables.

18. The method of claim 17, wherein the first generation module is configured to process only the first generation template, and the second generation module is configured to process only the second generation template.

19. The method of claim 17, further comprising:

invoking a code composer configured to build the first generation template by inserting code commands into the first generation template that reference database names of the first database tables.

20. The method of claim 17, further comprising:

invoking a code composer configured to build the second generation template by inserting code commands into the second generation template that reference database names of the second database tables.

* * * * *